United States Patent
Kishimoto et al.

(10) Patent No.: US 9,851,237 B2
(45) Date of Patent: Dec. 26, 2017

(54) CONTACT MATERIAL SUITABLE FOR SLIDER FOR FUEL SENDER, AND SLIDER FOR FUEL SENDER

(71) Applicant: TANAKA KIKINZOKU KOGYO K.K., Tokyo (JP)

(72) Inventors: Takaomi Kishimoto, Gunma (JP); Yoshinori Horiuchi, Gunma (JP); Osamu Sakaguchi, Gunma (JP); Kouzou Kashiwagi, Gunma (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 215 days.

(21) Appl. No.: 14/382,894

(22) PCT Filed: Mar. 12, 2013

(86) PCT No.: PCT/JP2013/056735
§ 371 (c)(1),
(2) Date: Sep. 4, 2014

(87) PCT Pub. No.: WO2013/137225
PCT Pub. Date: Sep. 19, 2013

(65) Prior Publication Data
US 2015/0027223 A1     Jan. 29, 2015

(30) Foreign Application Priority Data

Mar. 14, 2012 (JP) ................ P2012-056607

(51) Int. Cl.
*G01F 23/36*    (2006.01)
*H01B 1/02*     (2006.01)
(Continued)

(52) U.S. Cl.
CPC ............ *G01F 23/36* (2013.01); *C22C 5/04* (2013.01); *C22F 1/14* (2013.01); *H01B 1/02* (2013.01); *C22F 1/02* (2013.01)

(58) Field of Classification Search
CPC .................... G06F 23/36; G06F 23/30
See application file for complete search history.

(56) References Cited

U.S. PATENT DOCUMENTS 6,518,873 B1    2/2003 O'Regan
2002/0046601 A1    4/2002 Yasuda et al.
(Continued)

FOREIGN PATENT DOCUMENTS

JP    03059972 A  *  3/1991
JP    05295559 A  *  11/1993
(Continued)

OTHER PUBLICATIONS

Supplementary European Search Report, EP 13761852.6, dated Dec. 11, 2015.

*Primary Examiner* — Daniel J Colilla
(74) *Attorney, Agent, or Firm* — Roberts & Roberts, LLP

(57) ABSTRACT

Proposed is a contact material constituting a slider for a fuel sender, the slider moving on a conductor in conjunction with a float moving in accordance with a liquid level, wherein the contact material includes 10 to 25 mass % of nickel and a balance of palladium. The present contact material is useful in the light of material cost in addition to corrosion resistance and durability. The fuel sender is useful for vehicles, such as FFV, using composite fuel of alcohol and the like. The present invention allows for producing a slider for a fuel sender having excellent corrosion resistance and abrasion resistance.

3 Claims, 1 Drawing Sheet

(51) Int. Cl.
  *C22C 5/04* (2006.01)
  *C22F 1/14* (2006.01)
  *C22F 1/02* (2006.01)

(56) References Cited

U.S. PATENT DOCUMENTS

| | | |
|---|---|---|
| 2004/0196137 A1* | 10/2004 | Dedert .................... G01F 23/36 338/308 |
| 2005/0040929 A1 | 2/2005 | Dedert et al. |
| 2007/0163341 A1 | 7/2007 | Nagakura et al. |
| 2012/0103090 A1 | 5/2012 | Oike et al. |
| 2013/0239677 A1* | 9/2013 | Takagi .................. G01F 23/363 73/313 |

FOREIGN PATENT DOCUMENTS

| | | | |
|---|---|---|---|
| JP | 2003059607 A | * | 2/2003 |
| JP | 2005-503012 A | | 1/2005 |
| JP | 2007-139679 A | | 6/2007 |
| JP | 4240844 B2 | | 3/2009 |

* cited by examiner

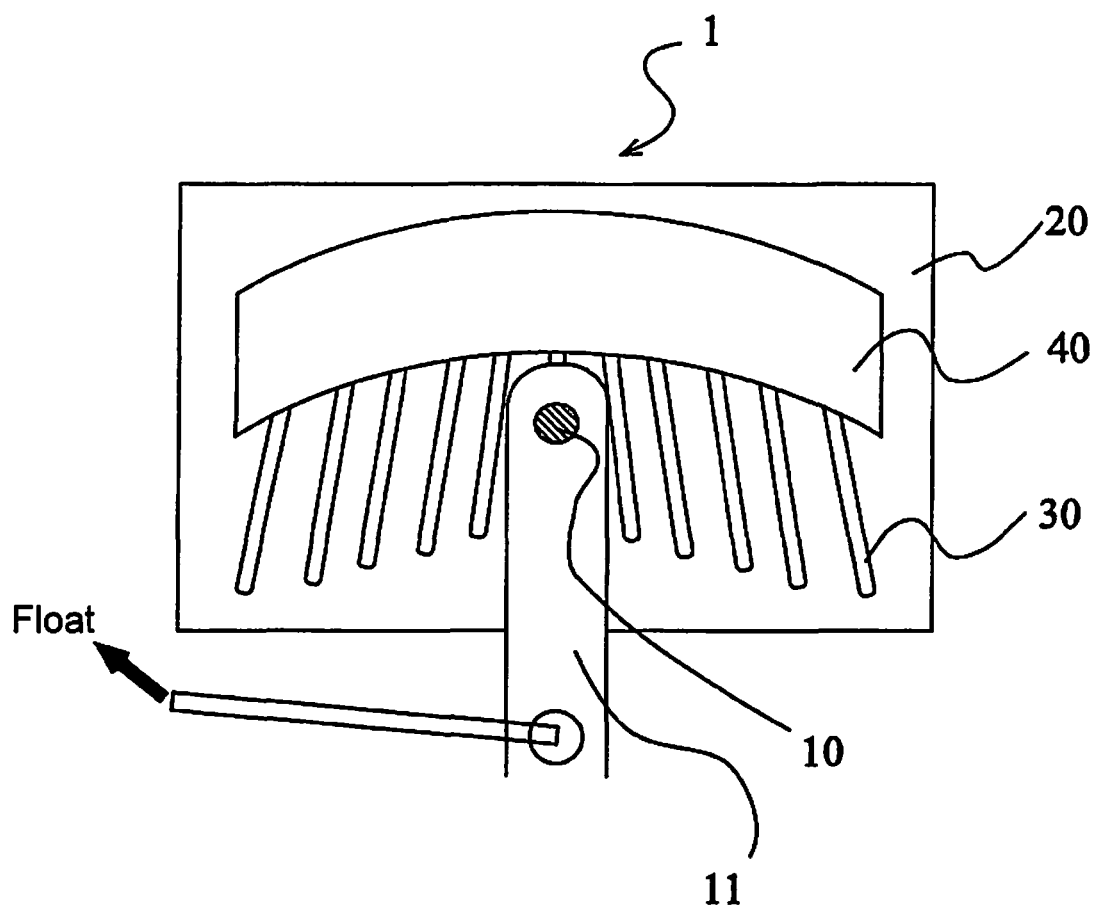

CONTACT MATERIAL SUITABLE FOR SLIDER FOR FUEL SENDER, AND SLIDER FOR FUEL SENDER

BACKGROUND OF THE INVENTION

Field of the Invention

Technical Field

The present invention relates to a contact material suitable for a constituent material of a slider of a fuel sender that detects the amount of fuel remaining in a vehicle.

Background Art

A fuel sender 1 (FIG. 1), which is a device for detecting the amount of fuel remaining in vehicles, has: a substrate 20 on which a conductor 30 and a resistor 40 are formed; and a slider 10 that moves while contacting the conductor 30. The slider 10 is installed in an arm 11 that moves in conjunction with a float rising and falling in accordance with a liquid level in a fuel tank. The slider 10 changes a value of the resistor with the movement of the arm 11. Then, a fuel gauge circuit applies a certain voltage to the fuel sender, and a voltage signal is taken out to measure the amount of fuel remaining.

From the viewpoint of function, the slider of the fuel sender is constituted of a contact material. For the conventional slider of a fuel sender, a contact material such as german silver (Cu—Ni—Zn alloy) and a silver alloy (Au—Ni alloy) has been used.

The conventional slider of the above-mentioned fuel sender has sufficient durability to Japanese-made fuel in which refining processing such as desulfurization is fully made. However, a flex fuel vehicle (FFV) has recently spread rapidly in other countries, and it has been required to respond for it. Although an FFV uses composite fuel of gasoline and alcohol (methanol, ethanol), when gasoline containing alcohol is deteriorated, formic acid or acetic acid is generated, and thereby the inside of a fuel tank is made to be a corrosive environment. Basically, foreign-made fuel is not subjected to sufficient desulfurization processing, and also has a problem of corrosion due to sulfur. In the case of such corrosive environment, a decrease in conductivity due to corrosion may occur in a conventional slider, and therefore the function as a measurement element may be lost.

As a technology regarding a fuel sender in consideration of corrosion resistance of its slider, for example, a technology described in Patent Literature 1 can be mentioned. This fuel sender has a slider formed of a contact material composed of gold (Au) or a gold alloy, and at the time when the slider moves on a conductor, the conductor is covered with gold having high corrosion resistance.

PRIOR ART LITERATURE

Patent Literature

[Patent Literature 1] Japanese Patent No. 4240844, specification

Since gold has high corrosion resistance to acid, it is deemed that this technology allows such a slider to be mounted in the above-described fuel tank under highly corrosive environment. However, the recent rise in gold price makes it difficult to apply gold to such an industrial use. Moreover, even if durable period is set up, it is not considered preferable to premise abrasion described above from the viewpoint of cost of components and the like. Especially, it is even more so for high-cost materials.

SUMMARY OF THE INVENTION

Problem to be Solved by the Invention

Thus, the object of invention is to provide a material that has excellent abrasion resistance in addition to good corrosion resistance as a contact material constituting a slider of a fuel sender.

Means for Solving the Problem

The present invention for solving the above problem is a contact material constituting a slider for a fuel sender, the slider moving on a conductor in conjunction with a float moving in accordance with a liquid level, wherein the contact material includes 10 to 25 mass % of nickel and a remainder of palladium.

Palladium has comparatively good corrosion resistance to an acid and a sulfide, and even under the corrosive environment due to them, conductivity is hardly decreased. On the other hand, palladium has poor hardness, and if palladium is applied to a slide component like the present invention, excessive abrasion occurs. In this regard, as in the example of the conventional technology of application of gold or a gold alloy, it is not a far-fetched idea to adhere palladium to a counterpart component while a contact material is thickened to wholly improve corrosion resistance. However, this would not be a good idea from a viewpoint of component cost as described above.

Thus, the present inventors have chosen nickel as an alloying element capable of securing abrasion resistance while maintaining the corrosion resistance of palladium, and have examined its suitable range. As a result, they have arrived at the present invention.

As described above, the content of nickel to palladium is 10 to 25 mass %. According to the present inventors' examination, addition of nickel raises hardness of the alloy and improves abrasion resistance while corrosion resistance is degraded. Herein, the slider of a fuel sender slides repeatedly while subjected to a certain load in a current-carrying state. In view of this characteristic use situation, nickel content is set to 10 to 25 mass % as the range that optimizes the balance of both characteristics of abrasion resistance and corrosion resistance. A more preferable range of nickel content is 15 to 25 mass %.

The contact material composed of a palladium alloy according to the present invention can be produced by a usual melting casting process, and its required hardness can be obtained by a suitable processing treatment. To make a slider, it is preferable the material was subjected to a processing with a processing rate of 40 to 60% after the material had been subjected to the last heat treatment in the processing process. Because of this processing treatment, hardness of the contact material becomes 150 or more, which provides durability suitable for a slider of a fuel sender. In the processing process, it is preferable to perform heat treatment in order to prevent a crack resulting from processing distortion, and it is preferable that the heat treatment is carried out under non-oxidizing atmosphere (inert gas atmosphere such as nitrogen, reducing atmosphere) at 700 to 900° C. for every processing of 40 to 60%.

The contact material according to the present invention is applied to a slider of a fuel sender, but other composition of this fuel sender is not particularly limited. Generally, conductive glass paste printed material is used for a conductor contacting the slider, and a similar material can be also applied in the present invention. Conventional materials can be also applied to a substrate, a resistor, and an arm for installing a slider.

Effect of the Invention

The contact material composed of a palladium-nickel alloy according to the present invention becomes a contact material optimal for a slider of a fuel sender because the nickel content is set to a suitable range. According to the present invention, there can be obtained a slider of a fuel sender that has high corrosion resistance to an acid and a sulfurated ingredient in fuel and has good durability to sliding.

BRIEF DESCRIPTION OF THE DRAWING

FIG. 1 is a diagram illustrating a configuration of a general fuel sender.

DETAILED DESCRIPTION OF THE PREFERRED EMBODIMENTS

An embodiment of the present invention will be described based on Examples described below. In this embodiment, palladium-nickel alloys having various amounts of nickel added were manufactured and, for test pieces formed by the processing of the alloy into the dimension equivalent to the slider, hardness and corrosion resistance were evaluated.

The palladium-nickel alloy was produced by the melting casting process. The respective base metals having high purity were mixed and melt in a melting furnace to produce an alloy ingot. Then, test pieces (20 mm length, 3 mm width, 0.3 mm thickness) were produced by forging processing and rolling processing. In this processing, heat treatment was performed at 750° C. in nitrogen flow for every processing of 40 to 60%. The processing rate on completion of the processing after the last heat treatment was set to 45%. Then, hardness measurement and a corrosion test were performed for this test piece.

Vickers hardness measurement (200 gf load) was performed as a hardness measurement of the alloy. Moreover, for a corrosion test, a Au probe was contacted with the surface of the following samples (10 gf load), and contact resistance was measured by an AC four-probe method (current value 10 mA): a sample formed by immersion of a test piece in a formic acid solution (0.1 mass %) and an acetic acid solution (0.1 mass %)at 58° C. for 300 hours; and a sample formed by exposure of a test piece to hydrogen sulfide gas (temperature 40° C., humidity 80%) in a concentration of 12.5 ppm (remainder: air) for 24 hours.

In each of the above-mentioned evaluation tests, with consideration for use conditions of the slider of the fuel sender, the following acceptance criteria were defined: hardness was 150 Hv or more and corrosion resistance (contact resistance) was less than 20 mΩ in any environment. In this evaluation test, a copper-nickel alloy as a conventional technology was also evaluated. This test result is shown in Table 1.

TABLE 1

| | Alloy composition (wt. %) | | | | Hardness | Test result Contact resistance (mΩ) | | |
|---|---|---|---|---|---|---|---|---|
| | Pd | Ni | Cu | Zn | (Hv) | Formic acid | Acetic acid | H$_2$S gas |
| Example 1 | 90 | 10 | — | — | 210 | 7.3 | 6.4 | 6.5 |
| Example 2 | 85 | 15 | — | — | 240 | 7.6 | 9.8 | 7.1 |
| Example 3 | 80 | 20 | — | — | 255 | 8.7 | 11.3 | 11.4 |
| Example 4 | 75 | 25 | — | — | 300 | 10.3 | 14.0 | 12.7 |
| Comparative Example 1 | 100 | — | — | — | 80 | 6.8 | 5.0 | 5.8 |
| Comparative Example 2 | 95 | 5 | — | — | 145 | 6.5 | 5.3 | 6.0 |
| Comparative Example 3 | 70 | 30 | — | — | 320 | 13.7 | 22.5 | 15.1 |
| Conventional example | — | 8 | 72 | 20 | 230 | ∞ | ∞ | 91.0 |

In view of Table 1, while the addition of nickel to palladium raises hardness, there is a tendency of decreasing corrosion resistance. Thus, when the above-mentioned acceptance criteria for the slider of fuel sender is taken into consideration, it is deemed that a suitable nickel content is 10 to 25 mass %.

INDUSTRIAL APPLICABILITY

The contact material composed of a palladium-nickel alloy according to the present invention is excellent in corrosion resistance and durability, and is optimal for a composition material of the slider of the fuel sender. Moreover, the contact material according to the present is useful also in the light of material cost. The slider of the fuel sender of the present invention is useful for vehicles, such as FFV, using composite fuel of alcohol and the like, and can contribute to the response to recent spread of the vehicles in the setting of energy problems.

What is claimed is:

1. A slider for a fuel sender, said slider being capable of moving on a conductor in conjunction with a float capable of moving in accordance with a liquid level, said slider comprising a contact material which comprises 10 to 25 mass % of nickel and a balance being palladium, which contact material has been formed by melt casting.

2. A fuel sender having the slider defined in claim 1.

3. A fuel sender for detecting a liquid level in a fuel tank which comprises: a substrate, a conductor on the substrate, and a resistor on the substrate, which resistor is electrically connected to the conductor, a slider electrically connected to the conductor and which slider is capable of moving on the conductor, the slider being connected to an arm, which arm is connected to a float, which float is adapted to rise and fall in accordance with a liquid level when positioned in a fuel tank, which slider changes a value of the resistor in response to a movement of the arm, the slider comprising a contact material which comprises 10 to 25 mass % of nickel and a balance being palladium, which contact material has been formed by melt casting.

* * * * *